Oct. 27, 1936. M. J. ULINE 2,058,744
MACHINE FOR SQUARING THE ENDS OF CAKES OF ICE
Filed Jan. 27, 1934 5 Sheets-Sheet 1
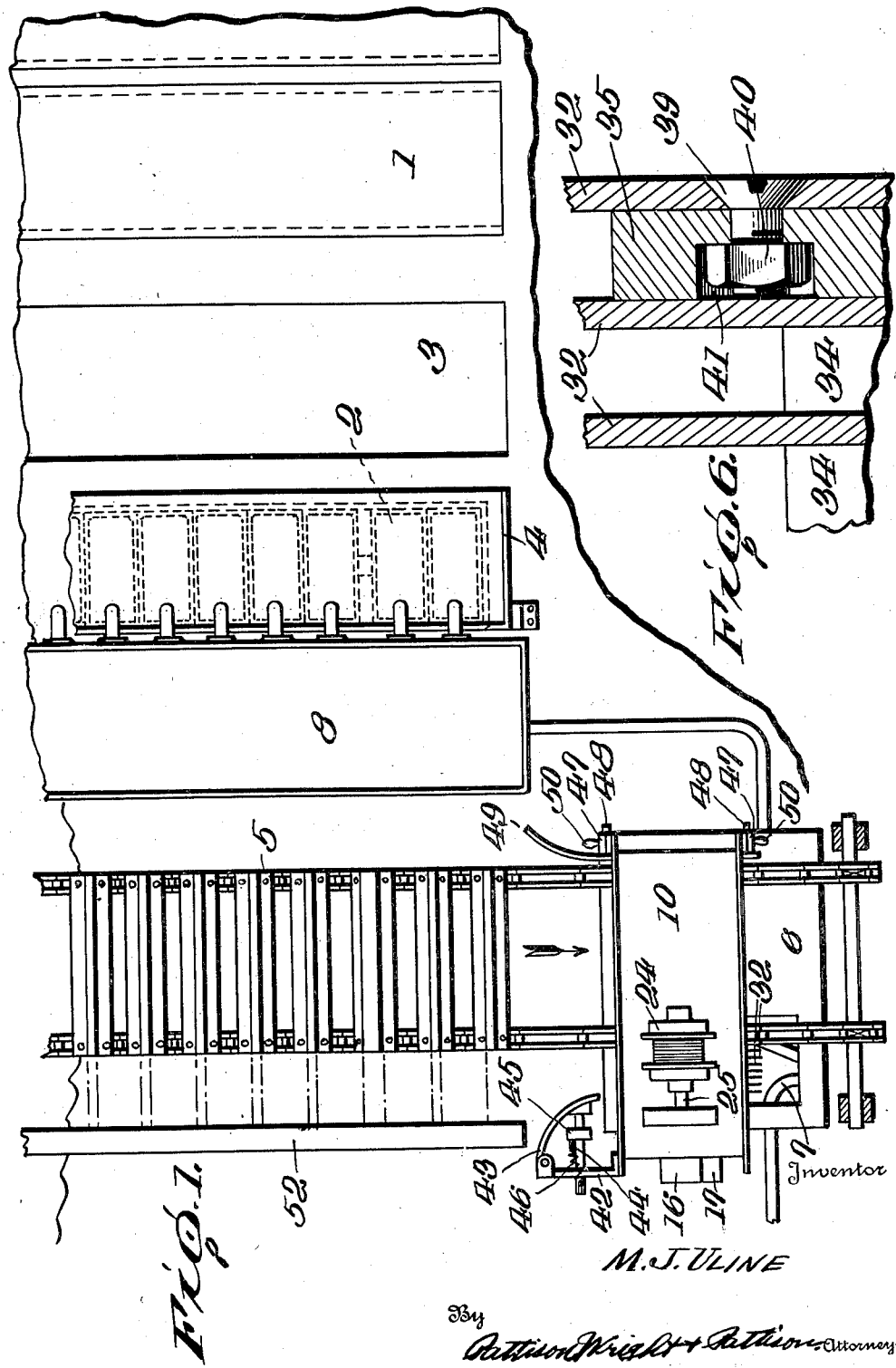

Oct. 27, 1936.   M. J. ULINE   2,058,744
MACHINE FOR SQUARING THE ENDS OF CAKES OF ICE
Filed Jan. 27, 1934   5 Sheets-Sheet 2
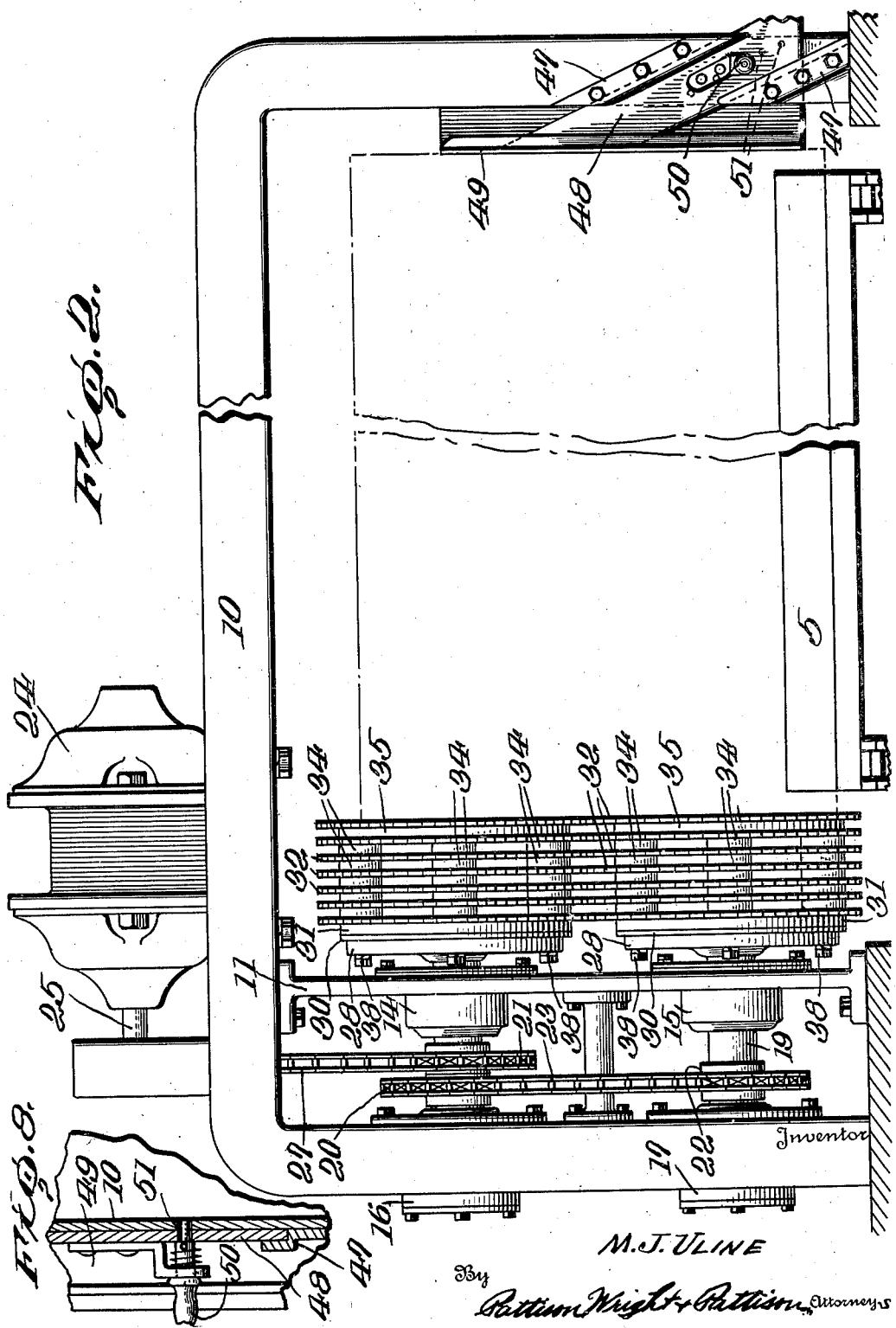

Oct. 27, 1936.  M. J. ULINE  2,058,744
MACHINE FOR SQUARING THE ENDS OF CAKES OF ICE
Filed Jan. 27, 1934  5 Sheets-Sheet 3
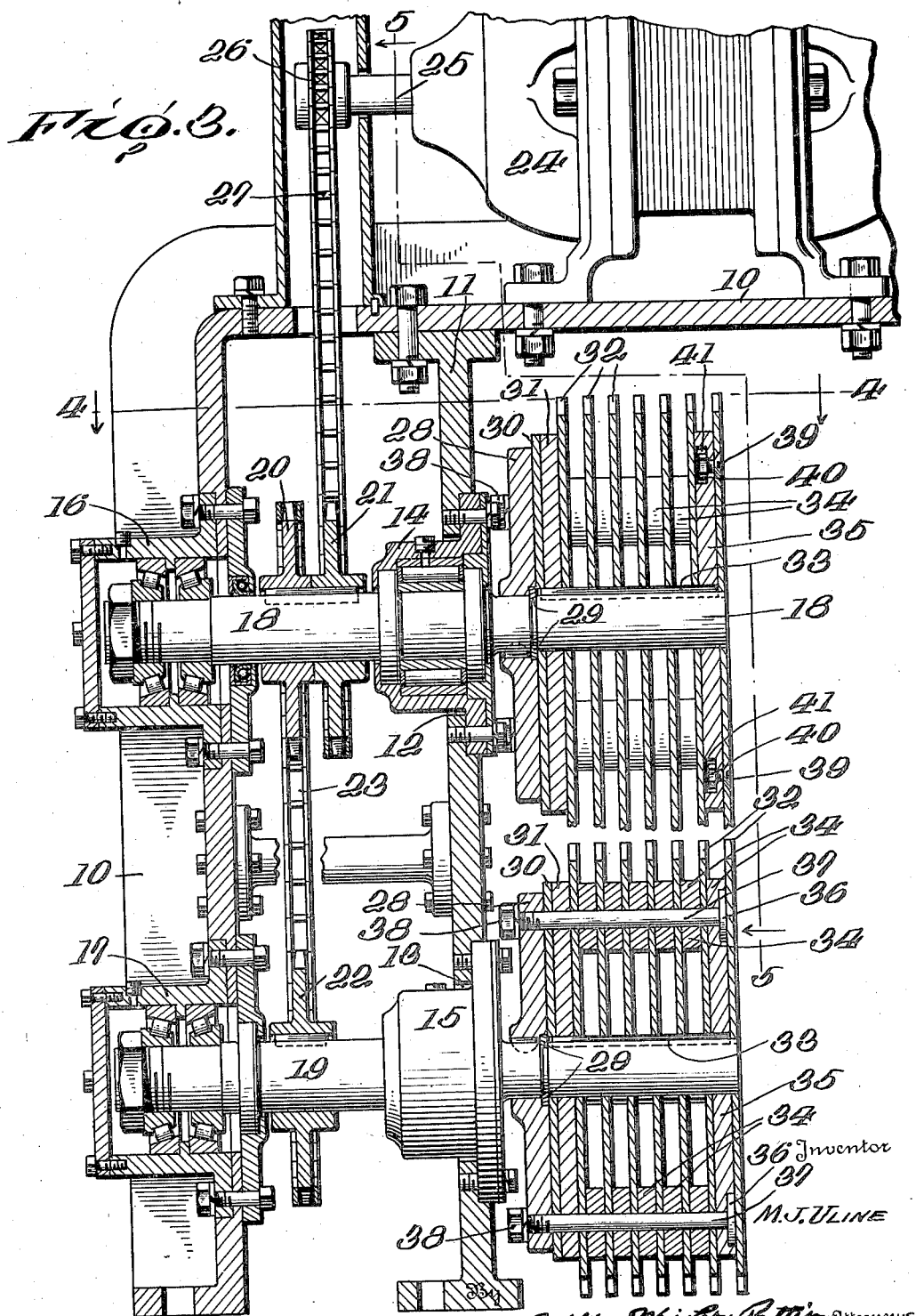

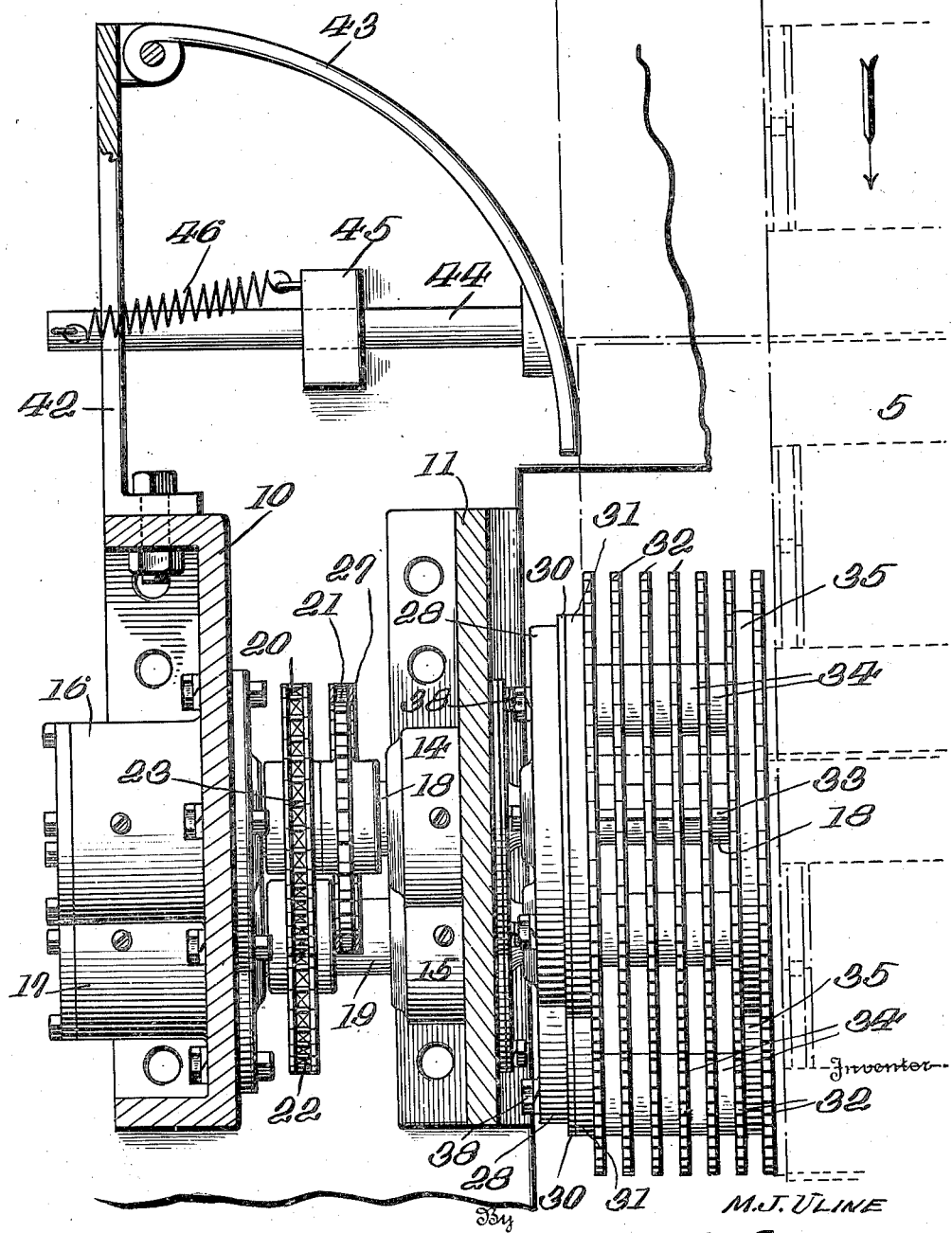

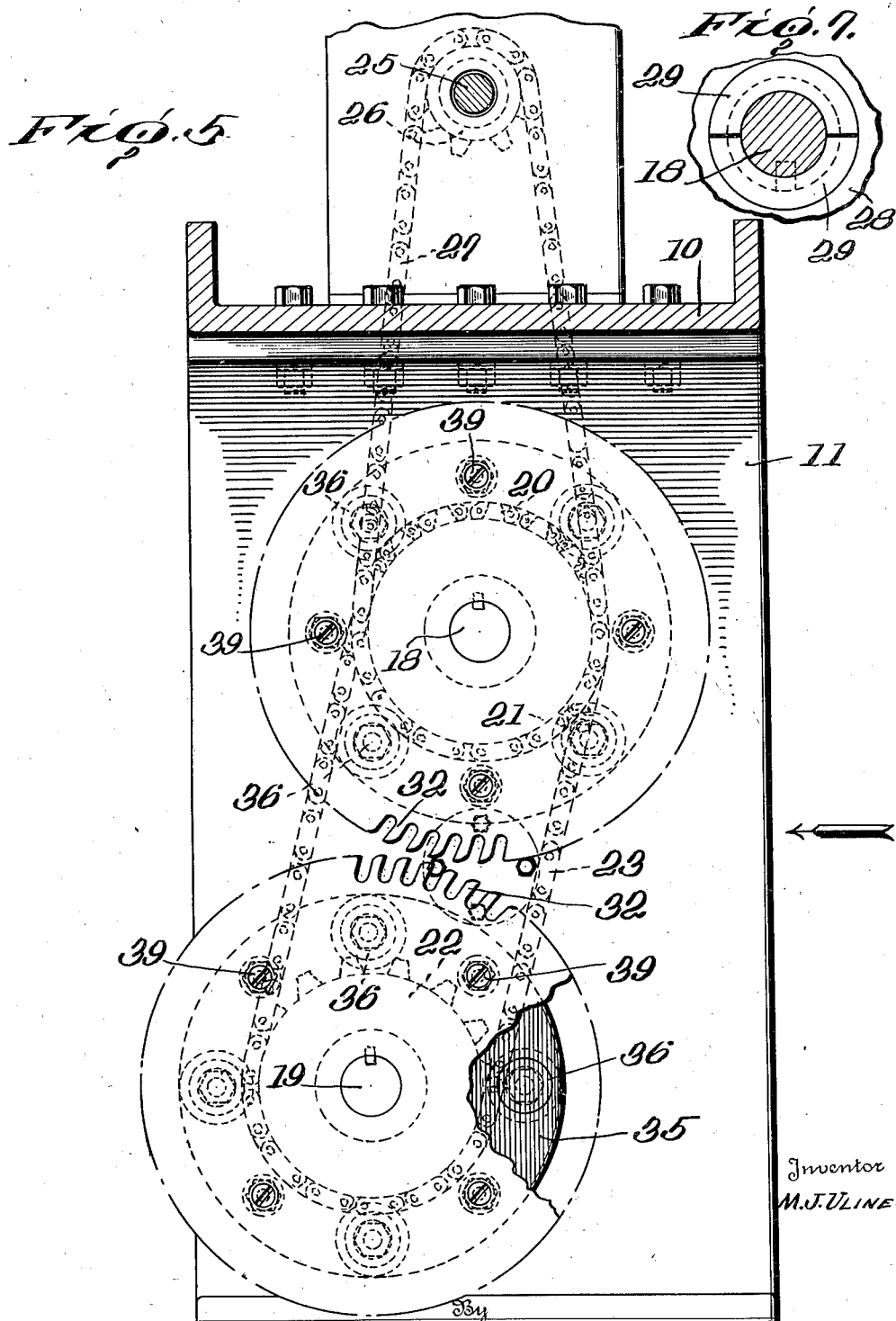

Patented Oct. 27, 1936

2,058,744

UNITED STATES PATENT OFFICE 2,058,744

MACHINE FOR SQUARING THE ENDS OF CAKES OF ICE

Migiel J. Uline, Washington, D. C.

Application January 27, 1934, Serial No. 708,666

5 Claims. (Cl. 125—13)

This invention relates to a machine for squaring the ends of cakes of ice as they come from the freezing can in order to cut the rough or white end of a cake of ice off squarely and is a companion application of applications executed even date herewith covering respectively; a method and apparatus for manufacturing oblong blocks of clear ice and a conveyor structure for receiving the cakes of ice from the cans and conveying them to the cutting machine as disclosed in this application.

Another object of my invention is to provide a machine in which a plurality of saws are employed arranged parallel to one another to form a cutting head which will saw off the end of a cake of ice so that the portion cut from the cake of ice will be reduced to small pieces in order to allow these pieces to be utilized for cooling the water employed for filling the cans to be frozen.

Another object of my invention is to provide a cutting machine which is exceedingly simple in construction, the same comprising an inverted U-shaped frame which is adapted to straddle the end of the conveyor upon which the cakes of ice are being moved so that these cakes will be brought into engagement with the cutting heads of the machine so that the ends will be cut off squarely whereby I am able to manufacture a rectangular block of clear ice having sharp corners and of a predetermined definite weight and size.

Another object of my invention is to provide novel means for guiding the cake of ice against the cutting heads, one of said means being adjustable to enable the same to be set at a predetermined position whereby a predetermined amount of ice will be cut from the block as it passes through the machine.

A still further object of the invention is to provide a machine in which the circular saws used to form the cutting heads are so mounted that they can be quickly assembled or taken apart in order to allow the saws to be sharpened, the head being so constructed that the end saw constituting the end of the head has a flat face in order to make a clean cut as it works its way through the end of the cake of ice, whereby the ice will be cut off squarely.

Other and further objects and advantages of the invention will be hereinafter set forth and the novel features thereof defined by the appended claims.

In the drawings,

Figure 1 is a top plan view showing the application of my improved construction of cutting machine for cutting off the rough or white end of a cake of ice as it is moved through the same on a conveyor;

Figure 2 is an elevation showing the position of the cutter in respect to the conveyor;

Figure 3 is a vertical section partly in elevation, showing the manner of mounting the cutting heads and the construction of the heads;

Figure 4 is a detail enlarged plan view, partly in section, showing the yieldable guide member for holding the block of ice against the gauge in order to properly position the same as it passes through the cutting machine;

Figure 5 is a vertical section taken on line 5—5 of Figure 3;

Figure 6 is a detail enlarged section showing the means of locking the end saw of the cutter in position;

Figure 7 is a detail section of a portion of the cutter showing the manner of mounting the head on the shaft; and Figure 8 is a detail section showing the means of locking the adjusting gauge in adjusted position.

In the embodiment of my invention as shown in Figure 1, I have shown the application of my cutter placed in an ice plant which is provided with freezing or brine tanks 1 in which units of cans 2 are adapted to be arranged, these units being adapted to be raised from the freezing tank by a crane, not shown, and dropped into a dip tank 3 in order to thaw the ice to allow the same to be removed therefrom. From the dip tank the cans are deposited on a dump 4 from which they are deposited on a conveyor 5 which travels under the frame of the cutting machine constructed in accordance with my invention as will be hereinafter fully described.

A cooling tank 6 is adapted to receive chips of ice cut from the blocks, said cooling tank having a coil 7 therein through which the water passes to the filling tank 8 from which it is fed into the cans after the cakes of ice have been dumped therefrom and they have been returned into a vertical position whereby chilled water will be used to fill the cans to reduce the time of freezing, thereby utilizing the ice wasted in cutting the ends off for cooling the water employed for filling the cans.

My improved construction of ice cutting machine comprises an inverted U-shaped frame 10 formed of a channel iron in which is arranged adjacent one end a standard 11 provided with openings 12 and 13 in which are arranged bearing housings 14 and 15. The adjacent vertical leg of the frame 10 is also provided with openings in horizontal alignment with the openings 12 and 13 in which are arranged bearing housings 16 and 17. The housings 14, 15, 16, and 17 are provided with roller bearings in which are mounted shafts 18 and 19, the shaft 18 having keyed thereon spaced sprocket wheels 20 and 21. The shaft 19 is provided with a sprocket wheel 22 carrying sprocket chain 23 which passes over the sprocket wheel 21 so that as the shaft 18 is driven, the shaft 19 will also be driven in unison therewith.

Mounted on the top of the U-shaped frame is an electric motor 24 provided with a driving shaft 25 carrying a sprocket 26 over which passes a chain 27 which extends around the sprocket 21 so that as the motor is operated, the shaft 18 is driven thereby. Secured on the inner end of the shaft 18 and on the end of shaft 19 are cutting or sawing heads A and B and as these heads are constructed exactly alike, the description of one will be sufficient for both. It will be noted that the shafts 18 and 19 are not in vertical alignment so as to allow the saws constituting the heads to overlap in order to make a clean cut as the cake of ice passes through the frame on the conveyor.

Each head comprises a disc 28 provided with an enlarged hub portion which is keyed on its shaft, the inner face of the disc surrounding the shaft within the hub portion being cut away to form a recess to receive a pair of semi-circular ring sections 29. Arranged adjacent the inner face of the disc 28 is a pair of discs 30 and 31.

A series of circular saws 32 are keyed on the shaft by key 33, these saws being spaced apart by spacing washer-like members 34 and a spacing disc 35. The spacing disc 35 is provided with a counter-sunk portion to receive the heads 36 of the bolts 37 which pass through openings formed in the spacing members and saws and through the discs 30 and 31 and the disc 28 and upon which are mounted nuts 38 so as to draw these members together and lock them in rigid position in respect to one another.

In order to have a flat outer face on the cutting heads the outer saw 32 is provided with counter-sunk openings in which screws 39 are mounted which engage nuts 40 seated in recesses 41 formed in the inner face of the spacing disc 35 and these openings can be formed of the shape corresponding to the nuts to prevent the same from turning or locking screws can be used for this purpose.

It will be seen that in assembling the spacing members and saws on the shafts when the semi-circular washers 29 are positioned within the recesses of the disc 28 and the disc 30 is forced against the face of the same, they are locked in position and by having these heads constructed in this manner, they can be readily taken apart to sharpen the saw if desired.

Arranged to one side of the conveyor and connected to the vertical leg of the inverted U-shaped frame is a member 42 to which is pivotally connected curved guide member 43 which is provided with a rod 44 extending through a guide 45 carried by the member 42 to which is connected a coil spring 46 which has its free end connected to the rod 44 as clearly shown so as to hold the curved member extended forming a yieldable bumper for the purpose hereinafter fully described.

The opposite leg of the inverted U-shaped frame is provided with inclined guideways 47 in which are mounted legs 48 of a curved gauge 49, which legs carry spring actuated handles 50 provided with pins adapted to extend into openings 51 formed in the legs in order to lock the gauge in its adjusted position and when the gauge is raised, the gauge is pushed outwardly from the leg and when lowered, is drawn inwardly towards the same. This gauge is for the purpose of predetermining the amount of ice to be cut off the end of the cake and as the ice moves on the conveyor, the end is brought into engagement with the yieldable guide 43 which forces the cake over against the gauge 49 and as the cake is moving on the conveyor, the rough or white end of the cake is brought into engagement with the rotary cutting heads and as these heads are rotating at a high rate of speed, the end of the cake is sawed off squarely so that a perfect oblong cake of ice is formed with squared edges of a predetermined size and weight. As the end of the cake of ice is sawed off, the chips on the heads fall into a cooling tank so as to cool the water being used for making the ice.

In the operation of a machine when in position as shown in the drawings, sixteen cakes of ice from the unit of cans are deposited onto the conveyor when stationary and through suitable control mechanism, the conveyor is started and moves slowly so as to bring these cakes of ice one at a time against the cutting heads so as to cut off the rough or white ends. The cakes are then deposited on an incline and travel by gravity to the storage room.

In the plan view it will be noted that a bumper 52 is arranged to one side of the conveyor opposite the dump so that as the cans of ice on the dump are tilted so as to allow the blocks of ice to slide onto the conveyor, these blocks will engage the bumper 52 in order to hold the blocks of ice on the conveyor so that when the conveyor is started these blocks will engage the yieldable guide so as to be guided to the proper position to have their ends cut off by the rotary cutters.

In the form of conveyor herein shown two sets of sixteen compartments are used corresponding to the number of cans in the unit, but it is, of course, understood that I do not wish to limit myself to the use of any number of compartments in forming a conveyor as the number of compartments will correspond to the number of cans in the unit.

In constructing the cutting heads of the saws, I wish it to be clearly understood that I do not wish to limit myself to any particular design of saw as I am aware that various designs of saws can be used in producing the cutting heads without departing from the spirit of my invention.

The rough or white end is commonly known in the art as a cup end of a cake of ice and the object of my invention is to remove this cup end of the ice in order to form a perfect cake free from all impurities.

What I claim is:

1. A machine of the kind described having a pair of superposed heads, each head comprising a supporting shaft with a plurality of spaced circular saws keyed thereon, a disc for spacing the outer pair of saws provided with recesses carrying nuts, screws passing through the outer saw having counter-sunk heads engaging said nuts for securing said outer saw in position and bolts passing through said saws and spacing members for securing said saws together.

2. A cutting machine having a pair of horizontally disposed shafts arranged out of vertical alignment, a plurality of saws keyed on said shafts with their peripheral edges overlapping the horizontal line drawn between said saws, said saws being spaced apart by spacing members, bolts passing through said spacing members connecting said saws together, the outer saw of each head being secured to the outer spacing member by screws having their heads counter-sunk in the outer face of said saw to form a flat face therefor.

3. In a machine for squaring the ends of cakes of ice, an endless conveyor provided with means for supporting and holding cakes of ice on edge, a frame bridging said conveyor provided with superposed cutting heads, said cutting heads comprising circular saws spaced apart, the outer saw having a flat face, said cutting heads being arranged out of vertical alignment, means for revolving said heads, an adjustable gauge carried by one-leg of said frame and a guide arranged to engage the blocks of ice on said conveyor and guide said blocks against said gauge into the path of travel of said cutters.

4. In a machine for squaring the ends of cakes of ice, an endless conveyor having spaced members extending outwardly therefrom adapted to extend up alongside of the cakes of ice for firmly supporting and holding the cakes of ice on edge to prevent said cakes from tilting, a frame bridging one end of said conveyor, a pair of superposed stud shafts mounted in said frame out of vertical alignment carrying cutter heads composed of a plurality of closely associated spaced saws, the outer saw in each head being flush with the end of its stud shaft, said heads being arranged to one side of said conveyor, means disposed to each side of said conveyor for engaging the ends of the cakes of ice for positioning and guiding the cakes of ice on said conveyor to said cutter heads and means for revolving said cutter heads to gnaw off the ends of the cakes of ice as they pass through said machine.

5. In a machine for cutting off the ends of cakes of ice, an endless conveyor provided with spaced members extending up alongside of the cakes of ice for supporting and firmly holding the cakes of ice on edge to prevent said cakes from tilting, a frame bridging said conveyor provided with superposed stud shafts out of vertical alignment, cutting heads carried by said shafts composed of a plurality of circular saws, the outer saw of each head being flush with the stud shaft, means for revolving said heads and means disposed to each side of said conveyor for engaging the opposite ends of the cakes of ice on said conveyor for guiding said blocks against said cutter heads for gnawing off the ends of the cakes of ice.

MIGIEL J. ULINE.